(12) United States Patent
Burger

(10) Patent No.: US 9,305,291 B1
(45) Date of Patent: Apr. 5, 2016

(54) METHOD AND APPARATUS FOR THIRD PARTY CONTROL OF A DEVICE

(75) Inventor: Michel C. Burger, Palo Alto, CA (US)

(73) Assignee: Digi International Inc., Minnetonka, MN (US)

( * ) Notice: Subject to any disclaimer, the term of this patent is extended or adjusted under 35 U.S.C. 154(b) by 2270 days.

(21) Appl. No.: 11/981,128

(22) Filed: Oct. 31, 2007

Related U.S. Application Data

(63) Continuation of application No. 10/290,023, filed on Nov. 6, 2002.

(51) Int. Cl.
    *G06Q 20/18*     (2012.01)
    *G06Q 20/04*     (2012.01)
    *G06Q 30/02*     (2012.01)

(52) U.S. Cl.
    CPC .............. *G06Q 20/18* (2013.01); *G06Q 20/04* (2013.01); *G06Q 30/0238* (2013.01)

(58) Field of Classification Search
    CPC ........................................................ G06Q 20/18
    See application file for complete search history.

(56) References Cited

U.S. PATENT DOCUMENTS

| | | | | |
|---|---|---|---|---|
| 5,392,297 | A | * | 2/1995 | Bell ............... G01R 31/318505 714/724 |
| 5,745,692 | A | * | 4/1998 | Lohmann et al. ............ 709/223 |
| 6,535,726 | B1 | * | 3/2003 | Johnson ................ G06Q 20/04 235/381 |
| 2002/0103945 | A1 | | 8/2002 | Owen et al. |
| 2002/0161896 | A1 | | 10/2002 | Wen et al. |
| 2002/0172190 | A1 | | 11/2002 | Vatanen |
| 2003/0158891 | A1 | * | 8/2003 | Lei et al. ...................... 709/203 |
| 2004/0040023 | A1 | | 2/2004 | Ellis et al. |
| 2004/0123115 | A1 | * | 6/2004 | Schuba et al. ............... 713/186 |
| 2006/0069722 | A1 | | 3/2006 | Dowling |
| 2006/0106679 | A1 | | 5/2006 | Rosenhaft et al. |

\* cited by examiner

*Primary Examiner* — Calvin L Hewitt, II
*Assistant Examiner* — Cristina Sherr
(74) *Attorney, Agent, or Firm* — Heimlich Law, PC; Alan Heimlich, Esq.

(57) ABSTRACT

A method and apparatus for third party control of a device have been disclosed. By utilizing a third party to control a device, view and control of a device may be separated.

11 Claims, 15 Drawing Sheets

US 9,305,291 B1

METHOD AND APPARATUS FOR THIRD PARTY CONTROL OF A DEVICE

RELATED APPLICATION

The present Application for Patent is a continuation of U.S. patent application Ser. No. 10/290,023 titled "METHOD AND APPARATUS FOR THIRD PARTY CONTROL OF A DEVICE" filed Nov. 6, 2002, pending, and is hereby incorporated herein by reference.

FIELD OF THE INVENTION

The present invention pertains to devices connected to a network. More particularly, the present invention relates to a method and apparatus for third party control of a device or a group of devices.

BACKGROUND OF THE INVENTION

Controlling a device may be broadly grouped into local and remote control. Local control of a device may be possible by a mechanism ranging, for example, from a simple switch (e.g. a light switch) to a computer controlled device (e.g. a computer terminal). Such local control is often activated by a human in close proximity to the device. In such cases, the device must be able to support the human inputs and be capable of displaying a result or feedback to guide the user. Often the human input requires that the device be much more "complicated" than its basic function. For example, a vending machine dispenses product, however the user interface may require a keypad, a coin/bill changer, a user display (e.g. for coins deposited), etc. Thus the "view" of the vending machine and the "control" of the machine are tightly coupled, especially from the viewpoint of the user. That is, the user believes that they are directly in control of the vending machine.

A remotely controlled device on the other hand, may have a "remote" user interface that still interfaces directly into the controlled device. Thus, the "remote" control is little more than an "extension cord" connected between the device and the user input device. The device must still process the user inputs. This remote control is tightly coupled to the device and thus may be "complicated" beyond its primary function. This presents a problem.

BRIEF DESCRIPTION OF THE DRAWINGS

The present invention is illustrated by way of example and not limitation in the figures of the accompanying drawings, in which like references indicate similar elements and in which:

FIGS. 8A, 8B, 8C, 8D, and 8E illustrate various embodiments of signal flow for FIG. 8A;

DETAILED DESCRIPTION

A Method and Apparatus for Third Party Control of a Device are Described

The present invention by providing for third party control of a device, allows for viewer controller separation and authentication with validation.

In the explanation below various terminology is used. These are understood by those of ordinary skill in the art. For the benefit of the reader the following should be noted. To provide a concise illustration of the present invention the context of the description will often refer to connecting machines or devices to a network. One of ordinary skill in the art will appreciate that the Internet is but one example of a network and that the present invention may be practiced with other networks.

Figure 3:
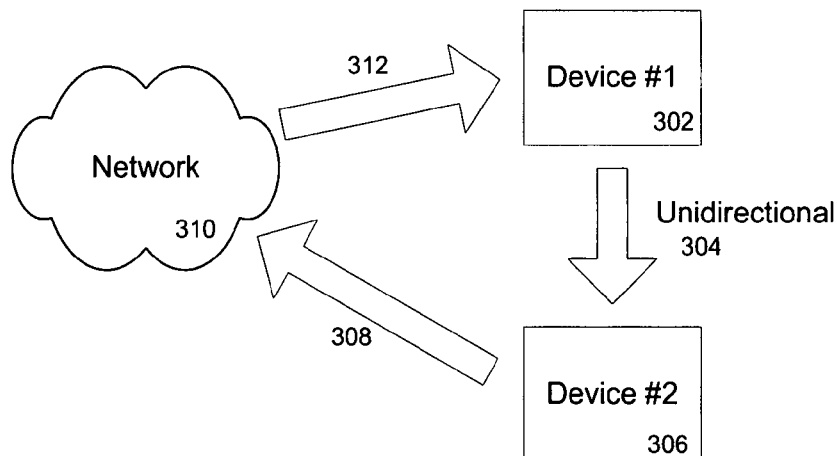
FIGS. 3, 4, and 5 illustrate various embodiments of the present invention.

FIG. 3 illustrates one embodiment of the present invention. Device #1 302 is communicating via a unidirectional link 304 information to device #2 306. Device #2 303 is then communicating via a one way link 308 information to the network 310. The network 310 is then communicating via link 312 information to device #1 302.

Thus, for example, in one embodiment of FIG. 3, device #1 may be a vending machine. Link 304 may be an infrared beam to device #2 306 a PDA. The PDA may then communicate via a wireless link 308 to a network 310 (e.g. the Internet). Finally the network 310 may communicate via 312 a wired link to device #1. In this embodiment the information conveyed via the link 304 may be a vending machine identification (ID) number. The user of device #2 may see that the vending machine has four choices and may press 1, 2, 3, or 4, to make a selection. The PDA may then connect to the network 310, and send the vending machine ID and the choice. Not shown are the intermediate steps of possibly checking the user's account for a sufficient balance for the transaction. The network 310 may then send a signal via link 312 to the vending machine to dispense the user selection.

Thus, in this example, the view of the vending machine has been separated from the control of the vending machine and only a one-way communication was established between the controlled device to the controlling device. However, from the user's standpoint, they may continue to believe that they are in direct control of the machine.

The choices that a user of a controlling device, for example a PDA, may select from may be coming from a preloaded program on the controlling device which is presented to the user in response to a device ID. Alternatively, the controlled device may send the ID and/or data, which allows the controlling device to use a generic interface, such as a web browser, for selecting choices. Another approach is where the PDA after receiving the information from the device will query a server at the network level to actually get the user interface to be displayed on the PDA. Other embodiments are also possible.

Figure 4:
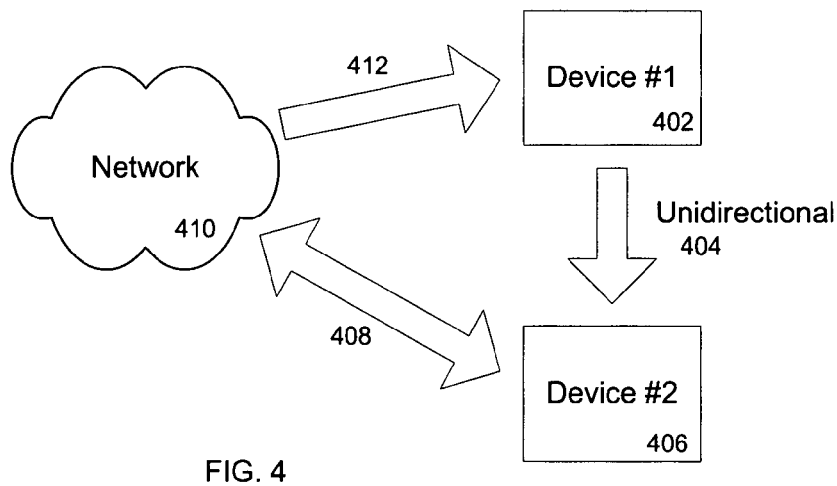

In the embodiment illustrated in FIG. 4, there is a bi-directional communication capability between device #2 406 and the network 410. This may allow the device #1 402 to be "dumber" than the embodiment illustrated in FIG. 3. The communication via link 404 to device #2 406 may still be as simple as an ID or more complicated such as a selection choice. For example, continuing the example of the vending machine, the device #2 406 (PDA) may now receive via the bi-directional link 408 from the network 410 a menu selection of items available from device #1 402 based on a lookup result from a database listing the contents in the vending machine based on the vending machine ID. The user may select an item and the network 410 would issue a command via link 412 to the vending machine (device #1 402) to dispense the item.

Figure 5:
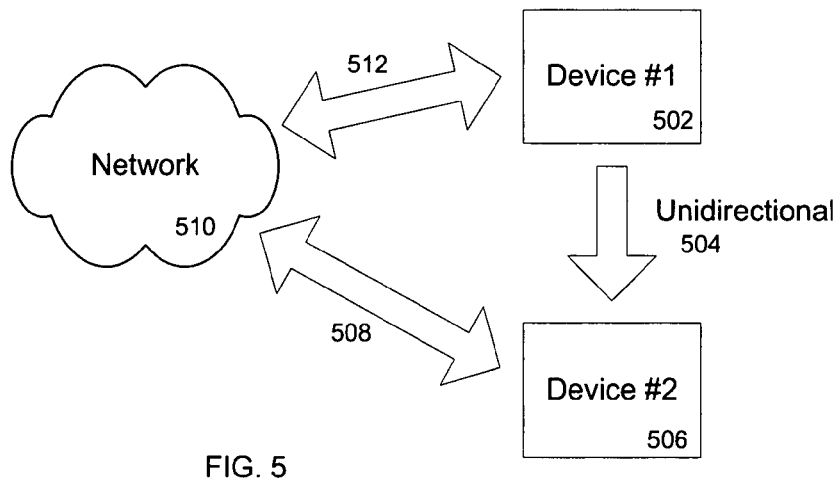

In the embodiment illustrated in FIG. 5, there is a bi-directional communication link between device #1 502 and the network 510. This may allow the device #1 502 to be "queried" and respond to the network 510 with status, information, acknowledgements, etc. For example, continuing the example of the vending machine, the device #2 506 (PDA) may receive an ID from device #1 502. This may be conveyed via link 508 to the network 510 that may query device #1 via 512 as to the current contents actually in the vending machine. A reply via link 512 to the network 510 may then be relayed to the user device (device #2 506) via link 508. The user of device #2 may then have a more accurate view of device #1. The user may make a selection based on actual content information and network 510 could send a signal to device #1 502 to perform an operation. An acknowledgment could be sent by device #1 502 via link 512 to the network 510 to complete the transaction (e.g. actually charging the user of device #2's account once the item is dispensed).

One of ordinary skill in the art will appreciate that other combinations are possible as well. For example, communication between device #1 and a network may be bi-directional while communication from device #2 to the network may be unidirectional. What is to be appreciated is that the present invention allows viewer and controller separation. An important aspect is to understand that the communication between device #1 and device #2 is unidirectional (from device #1 to device #2).

Figure 6:
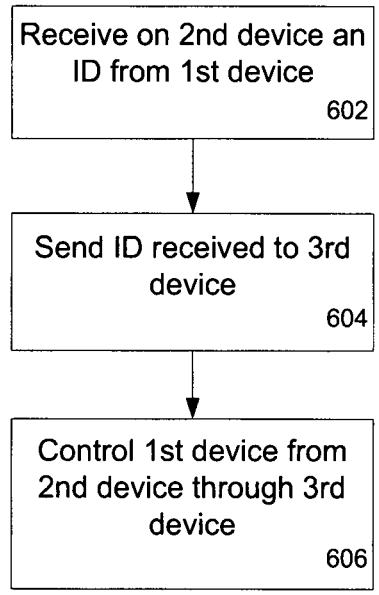
FIG. 6 is a flowchart illustrating one embodiment of the present invention.

FIG. 6 is a flowchart illustrating one embodiment of the present invention. Here at 602 an ID from a 1st device is received by a 2nd device. At 606 the ID received by the 2nd device is sent to a 3$^{rd}$ device. At 606 control of the 1$^{st}$ device is effected from the 2$^{nd}$ device though the 3$^{rd}$ device.

Figure 7:
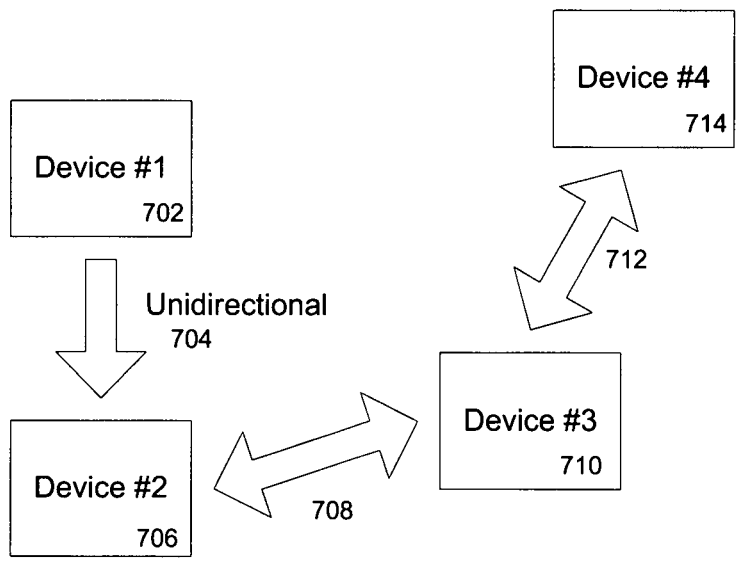
FIG. 7 illustrates one embodiment where the ID and controlled device are separate.

FIG. 7 illustrates one embodiment of the present invention. In this more general embodiment, the device, emitting for example an ID, is separate from the device controlled. Here at 702 an ID from device #1 is sent via link 707 to device #2 706. Device #2 706 communicates via link 708 to device #3 710 which in turn communicates via link 712 with device #4 714. In this embodiment device #2 706 controls device #4 714.

One of ordinary skill in the art will understand that other combinations of communication links (unidirectional and bi-directional) for links 708 and 712 are possible for FIG. 7.

Figure 8A:
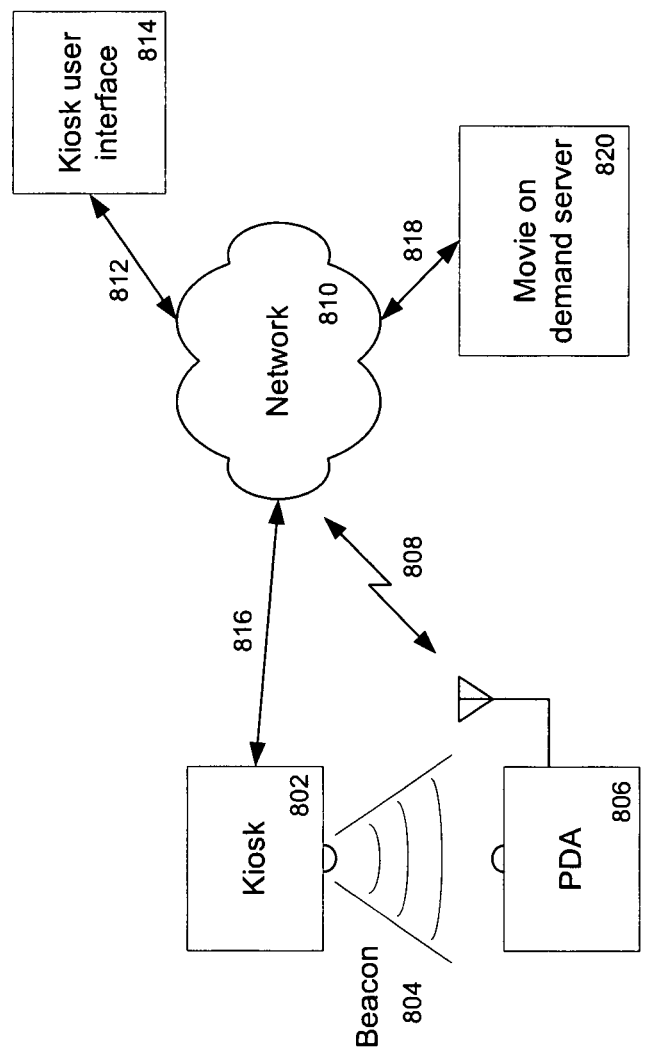
FIG. 8A shows one embodiment of the present invention.

FIG. 8A illustrates one embodiment of the present invention. For example, in this embodiment, a kiosk 802 emits a beacon 804 sending an ID that is received by a PDA 806. The user of the PDA 806 sends this ID or information based on this ID via a wireless link 808 to a network 810 which communicates this information via link 812 to a kiosk user interface 814. The kiosk user interface 814 may then communicate via link 812, network 810, and link 816, a selection of choices on kiosk 802 (or it may communicate the choices directly to the PDA 806). Further information from the beacon 804 may or may not be sent to the PDA 806. The user may then make a selection of a movie. This gets communicated via 808 to the network 810, which may query the movie on demand server 820, for example, for a price. The price may be communicated back to the PDA 806 via 808 for final approval by the user and/or this information may be relayed from the movies on demand server 820 via 818, the network 810, link 812 to the kiosk user interface 814 which may via the links have the kiosk 802 display this information. The user may approve the purchase (not shown are possible financial transactions) and then the movie on demand server 820 may send to the kiosk 802 via the network 810 and links 818, and 816 the movie for display.

Other embodiments of the invention may have different signal flows for FIG. 8A and use different features. For example, a constant communication from the kiosk to the PDA may be a way for the PDA to detect that the kiosk is still in range and that the user holding the PDA is in viewing range. Various other embodiments showing signal flows are illustrated in FIGS. 8B, 8C, 8D, and 8E.

Figure 8B:
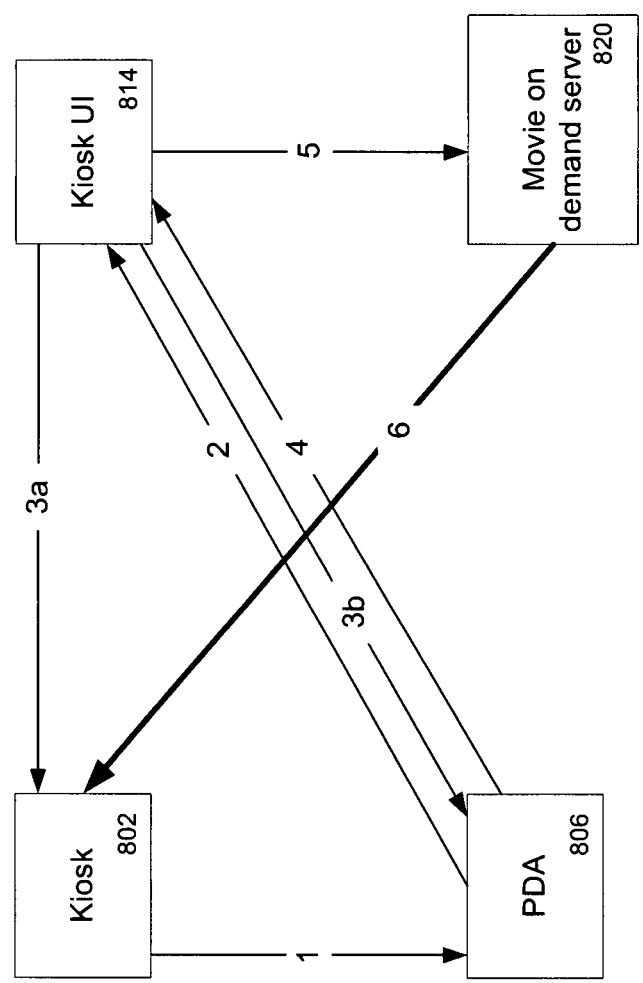

FIG. 8B illustrates a signal flow. Referring to FIG. 8B, see signal flow 1, denoted as (1) in the text.

Signal flow (1): Data is sent from the Kiosk 802 to the PDA 806. The data is an ID (scheme://host/deviceID) and may have other data about current state of the Kiosk 802.

Signal flow (2): The PDA 806 sends information to the Kiosk UI 814 (defined by the host) after optional processing on the PDA 806 itself. The PDA 806 after receiving the information (via (1)) from the Kiosk 802 may display a menu from a program preloaded on the PDA 806.

Signal flow (3a-b): Based on the information received in (2) the Kiosk UI 814 may update the display of the Kiosk 802 (via 3a) (if the Kiosk 802 has a display) and may also update the PDA 806 with the event (3b).

Signal flow (4): Based on the information received, the PDA 806 will update the PDA UI and may offer new choices like ordering a movie. The user by selecting a choice will send it (4) to the Kiosk UI 814.

Signal flow (5): The Kiosk UI 814 will pass the choice (5) to a Movie on demand server 820 with the necessary information to establish a media connection (6) with the Kiosk 802.

Signal flow (6): A media connection is established (6) between the Movie on demand server 820 and the Kiosk 802.

In a variation of FIG. 8B, the PDA 806 may still receive regularly the event (1) to make sure that the Kiosk 802 is still in proximity with the PDA 806, and therefore maintain the media connection (6) between the Movie on demand server 820 and the Kiosk 802.

Each component, the Kiosk 802, PDA 806, Kiosk UI 814, and the Movie in demand server 820 may be smart enough to process the information received with some preloaded program or some program loaded on demand (extra steps not shown here).

Figure 8C:
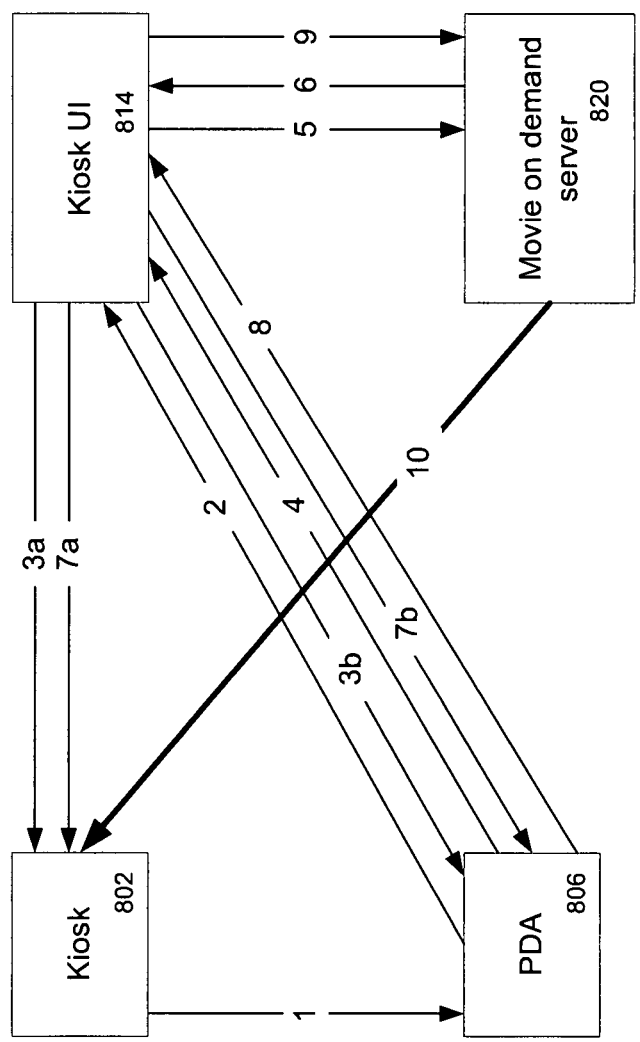

FIG. 8C illustrates a signal flow which has the same starting scenario as FIG. 8B with a difference beginning at signal flow (6):

Signal flow (6): The Movie on demand server 820 provides more information to the Kiosk UI 814, such as movie status, promotions available, etc.

Signal flow (7a-b): The Kiosk UI 814 sends information to the Kiosk 802 (7a) and the PDA 806 (7b) to update (if necessary) the UI of the PDA 806 and the Kiosk 802 to reflect the information sent by the Movie on demand server 820.

Signal flow (8): The user may select a choice presented to him/her that will send an event to the Kiosk UI 814 (8).

Signal flow (9): The Kiosk UI 814 passes the event (9) to the Movie on demand server 820 that will trigger the establishment of a media connection between the Kiosk 802 and the Movie on demand server 820.

Signal flow (10): The media path (10) is established between the Movie on demand server 820 and the Kiosk 802.

The event passing may be passive (the event is passed without modification and value added service) or active (a program running on an available processing unit may filter and/or modify the event before passing it to the next component).

The media path may be direct between the Movie on demand server 820 and the Kiosk 802, but may also be done via a media gateway associated with the Kiosk UI 814.

Figure 8D:
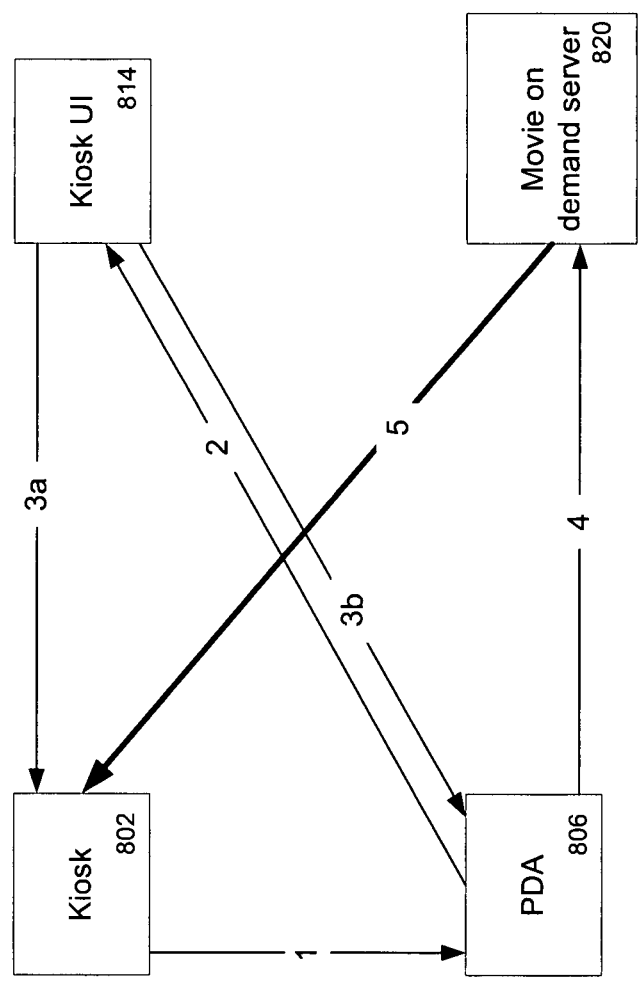

FIG. 8D illustrates a signal flow which has the same starting scenario as FIG. 8B with a difference beginning at signal flow (4):

Signal flow (4): The event (3b) sends information about the Movie on demand server 820 and the Kiosk 802. The user by selecting a choice presented to him on the PDA 806 will send the event (4) directly to the Movie on demand server 820 with the information about how to establish a media connection between the Movie on demand server 820 and the Kiosk 802.

Signal flow (5): The media connection (5) between the Movie on demand server 820 and the Kiosk 802 is established.

In another scenario, if the PDA 806 does not receive the signal (1), it may generate an event (6) (not shown on the diagram) that will release the media connection (5) between the Movie on demand server 820 and the Kiosk 802.

Another possible action is for the user to select a choice on the UI of the PDA 806 to be sent to the Movie on demand server 820 to disconnect the media connection (5) between the Movie on demand server 820 and the Kiosk 802.

Figure 8E:
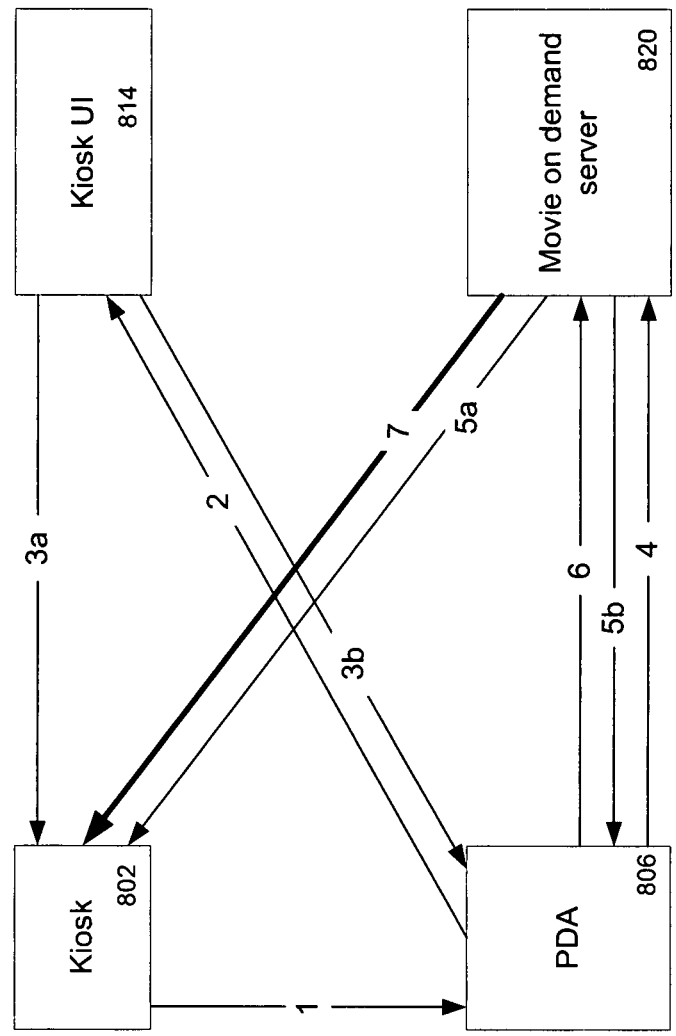

FIG. 8E illustrates a signal flow which has the same starting scenario as FIG. 8B with a difference beginning at signal flow (4):

Signal flow (4): While the PDA 806 is providing the information (via (4)) about the Kiosk 802 to the Movie on demand server 820, it also sends a query for more information to the Movie on demand server 820.

Signal flow (5a-b): The movie on demand server 820 will send an event (via (5a)) to the Kiosk 802 and to the PDA 806 (5b) in order to update the UI on both devices (if it is needed).

Signal flow (6): Based on the information received and the UI changes on the PDA 806, the user can select a choice that will be sent (6) to the Movie on demand server 820.

Signal flow (7): A media connection (7) is then established between the Movie on demand server 820 and the Kiosk 802.

Thus, it is to be understood that there are many embodiments possible.

Figure 9A:
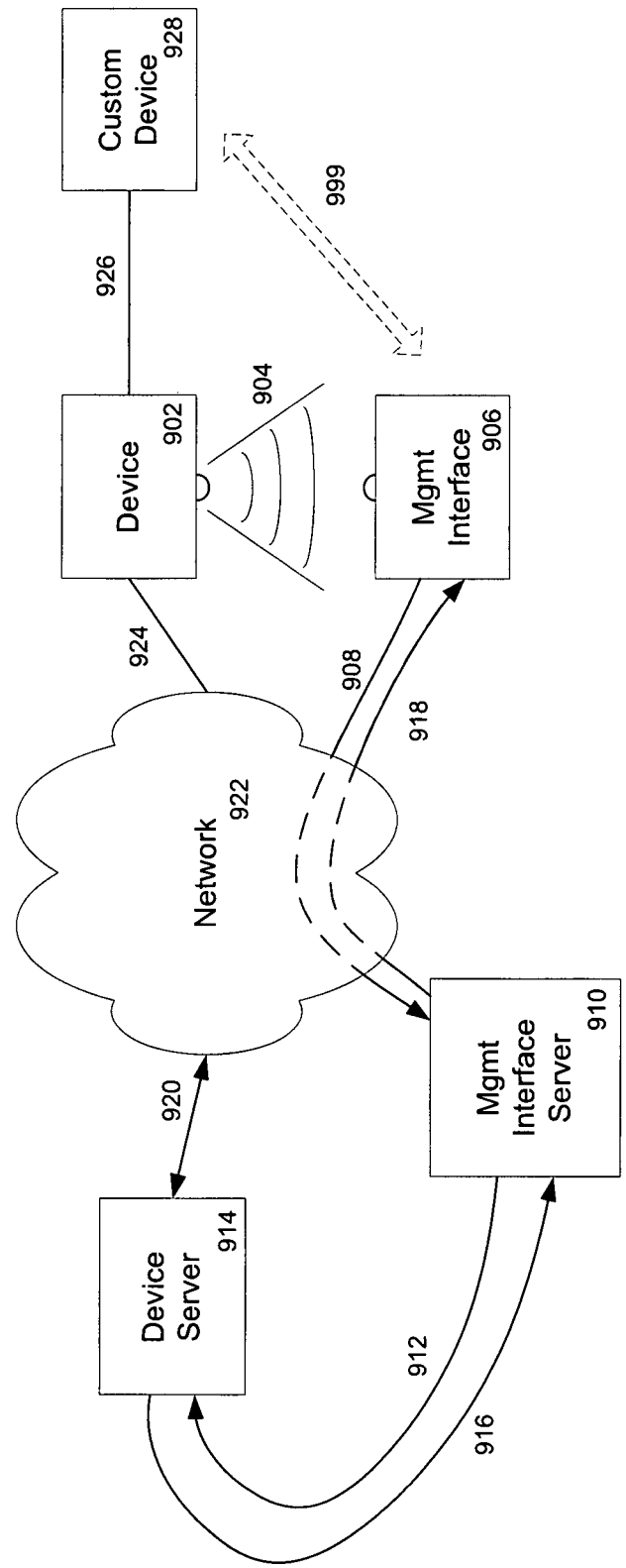
FIG. 9A shows one embodiment of the present invention.
Figure 9B:
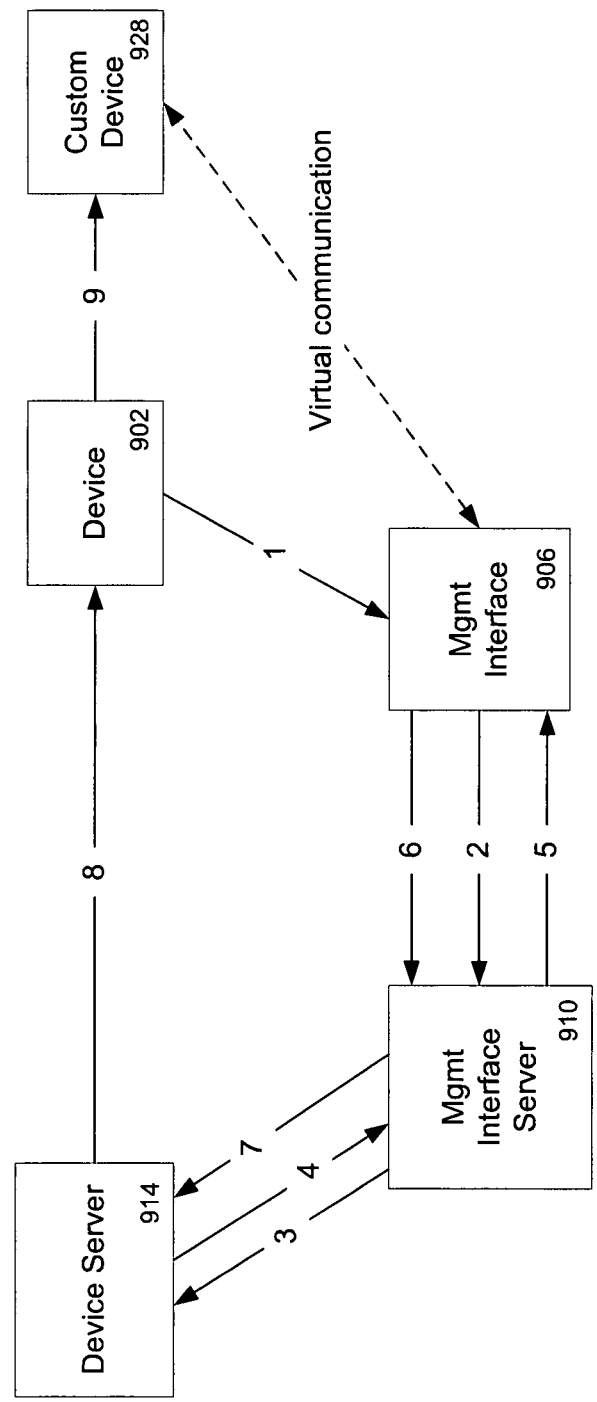
FIG. 9B illustrates an embodiments of signal flow for FIG. 9A.

FIG. 9A illustrates one embodiment of the present invention and FIG. 9B shows signal flows for FIG. 9A. For example, in this embodiment, a custom device 928 is shown controlled via management interface 906 (virtual link 999 between 928 and 906). Device 902 sends information via channel 904 to the management interface 906 (1). Management interface 906 sends via channel 908 information based on the communication received via channel 904 and/or user inputs on the management interface 906 (2). Communication via channel 908 is shown going to the Network 922 and, for purposes of illustration, is shown via dashed lines eventually being communicated to management interface server 910. Management interface server 910 may then communicate via channel 912 with device server 914 (3). Device server 914 may communicate with the management interface server 910 via channel 916 (4). The management interface server 910 may then communication via channel 918 and the network 922 to the management interface 906 (5). The user may select an option on the management interface 906 that is sent to the Management Interface server 910 via the channel 908 (6). The selection is then forwarded (potentially modified and/or filtered) to the Device server 914 via the channel 912 (7). The device server 914 interfaces via channel 920 to the network 922. The network 922 communicates via channel 924 to device 902 (8), and device 902 communicates via channel 926 to control the custom device 928 (9). From the viewpoint of the user of the management interface 906 it appears that they are directly controlling the custom device 928. This may be viewed as a virtual connection 999 between the management interface 906 and the custom device 928.

Referring again to FIG. 9, the following is an example of a possible embodiment and communication sequence. Device 902 may be an interfacing device connected via 924 to the network 922, such as an Internet connection, and via 926 interfacing to a washing machine in a Laundromat. The interfacing device 902 is sending out an IR (Infrared) beacon 904 that is picked up by the management interface 906, a user's PDA for example. The IR beacon may be sending out an identification of the washing machine, for example, in a location format such as http://hosts/company_name/store_ID/washing_machine_ID format. The PDA, equipped with a wireless connection capability, may initiate a communication to a network when the user of the PDA hits a send button. Communication 908 to the management interface server 910 (a server for PDA management) may send the ID along with other information, possibly from the PDA, such as a user identification, etc., and may ask the PDA management server (910) for a registration request for access to the washing machine. The PDA management server (910) may communicate a request for management and registration to the device server 914 (a washing machine server identified by the host as part of the ID sent by the washing machine). The washing machine server and the PDA server perform a negotiation via 912 and 916. This negotiation may include a variety of operations, such as checking and providing an interface to the washing machine to the PDA management server so that the PDA user sees a properly formatted display on their PDA screen of available options (e.g. type of wash cycles, costs, start/stop button, etc.). Once the negotiation is completed the PDA displays the management interface (to the washing machine). After the user of the PDA has the washing machine interface display, from that moment on the PDA can act on the device, the washing machine, as if the PDA was talking directly to it. However, because all the information for control is going through the network, modifications for control and interfacing can be made at the network level rather than the local PDA or washing machine level. For example, the initial washing machine display on the PDA may have been in black and white. As color displays become available, the PDA server, could query the PDA to see if color is supported, and if so, then use a color interface on the PDA.

One of ordinary skill in the art will realize that at the network level many other embodiments of the present invention are possible. For example, servers on the network could handle such things as language translations, currency exchange rates, etc. In this way a user from one country could be presented information in their native language, currency, etc., even if the machine they are controlling is located in another country they are visiting. It is also to be understood that other servers, such as billing or verification servers, may be involved in the transaction either at the device server level or at the Management interface server level.

Figure 10A:
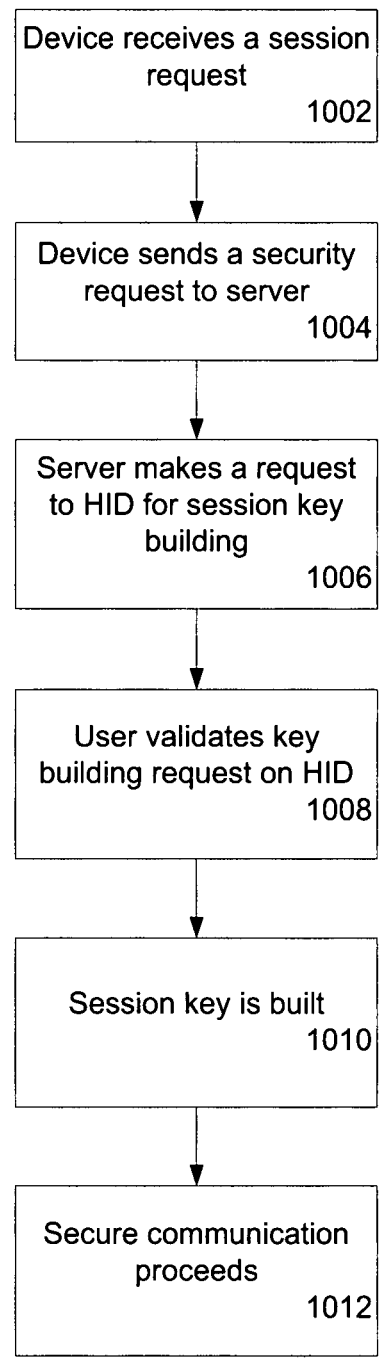
FIG. 10A is a flowchart illustrating another embodiment of the present invention.
Figure 10B:
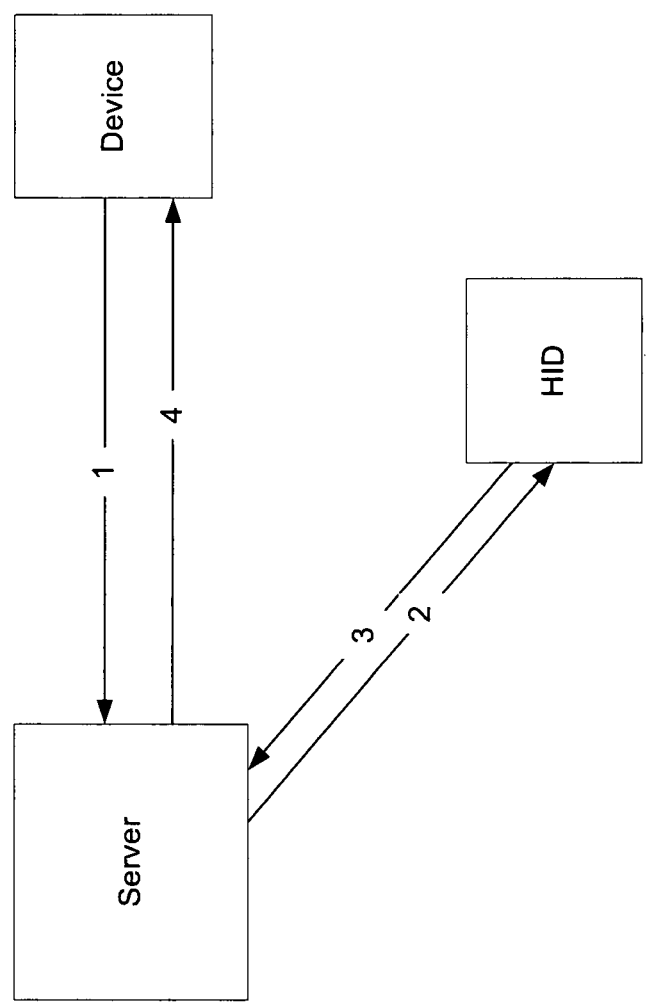
FIG. 10B shows signal flows for FIG. 10A.

FIG. 10A is a flowchart illustrating another embodiment of the present invention and FIG. 10B shows signal flows for FIG. 10A. In this embodiment, an authentication with a user validation is processed. At 1002 a device receives a session request. The device sends a security request to a server 1004 (signal flow 1). The server makes a request to a human input device (HID) for session key building (2). At 1008 the user validates the key building request on the HID (3). The session key is built 1010, and using this key secure communications may proceed 1012 (4).

For example, a postal stamp vending machine may receive a request to dispense a roll of stamps. It may, based upon the size of the transaction, send a security request to a postal vending machine server interfaced to, for example, the Internet. The postal vending machine server may then make a request via the Internet, wireless network, etc. to the user's telephone for a session key building request. From the user's perspective, this may be a request to proceed with the transaction by entering, for example, a password, credit card number, ID number, smartcard, biometric identification, etc. This may be received by the server which will then generate a session key which may be used by the postal machine, the server, and/or the PDA for secure communications.

Figure 11A:
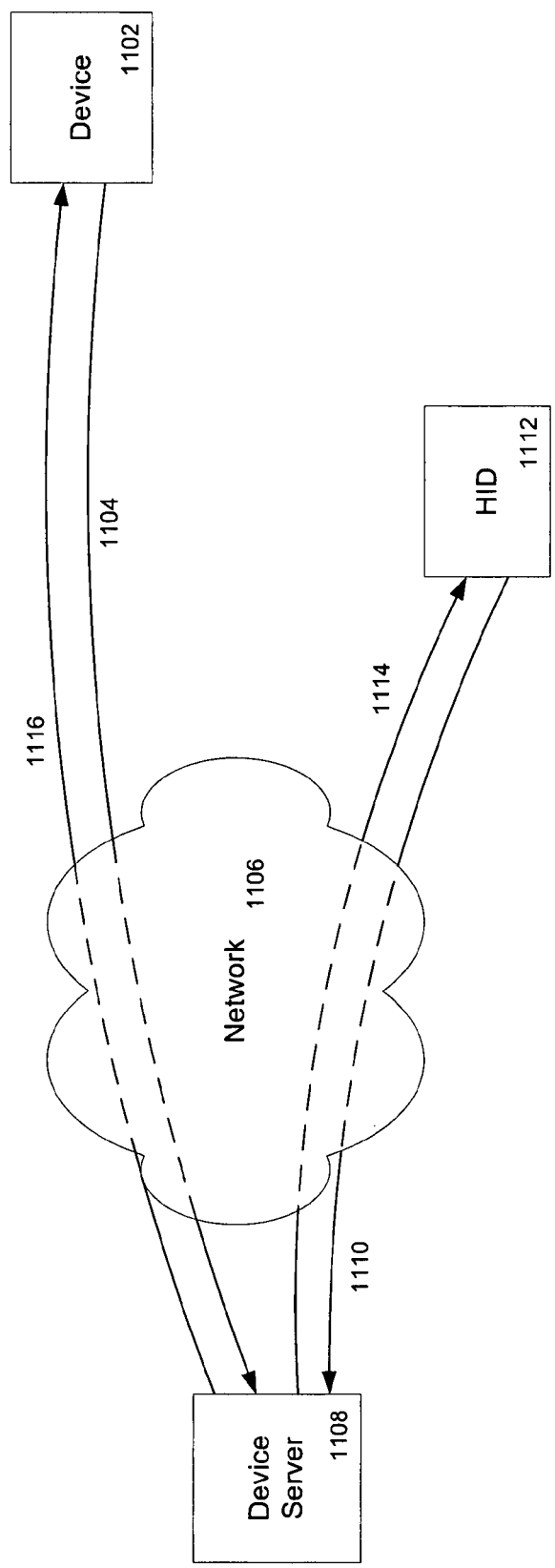
FIG. 11A illustrates another embodiment of the present invention.
Figure 11B:
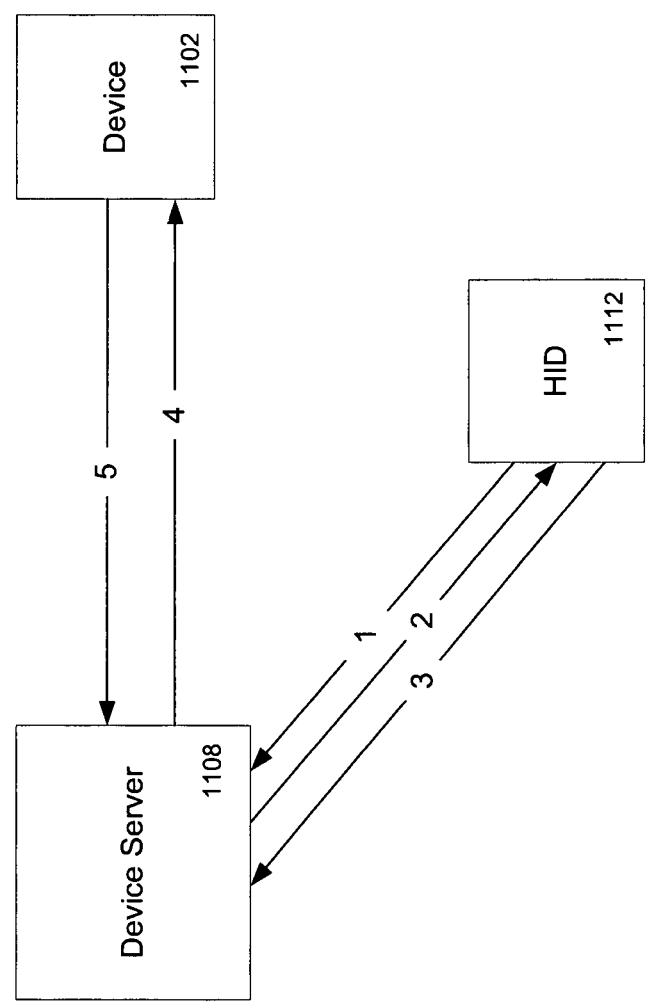
FIG. 11B shows one embodiment of signal flows for FIG. 11A.

FIG. 11A shows an embodiment of the present invention and FIG. 11B shows signal flows for FIG. 11A. Here, a device server 1108 has received a request to perform an action from the human input device (HID) 1112 via signal 1110 through network 1106 (signal flow 1). The device server 1108 may then determine that the communication should be secured and will send via signal 1114 through the network 1106 a request to the HID 1112 for a password for session key building (2). The HID 1112 after receiving the user input may additionally encrypt the communication via 1110 and 1106 back to the device server 1108 (3). The device server 1108 may then build a session key which may be used via the HID 1112 and the device 1102 for control via signals 1116 an/or 1114 in controlling device 1102 (4) (5).

One of ordinary skill in the art will appreciate that many variations of the present invention are possible. For example, for added security, if the user interface device, such as a PDA stops receiving a beacon from the controlled device, the connection and control capability to the device may be terminated.

Thus the present invention allows for view controller separation. Today a PDA/phone may communicate directly with a device, for example, a phone may communicate to a vending machine, the vending machine does the validation, sends the validation result to the PDA, the PDA then has access to the machine, and then the user is in control. The present invention, in one embodiment, by using a one-way "beacon" from the device for identification, such as a bar code, a RFID (Radio Frequency ID), infrared signal, or as simple as a number on the device (which the user may enter manually, via a bar code scan, etc.), controls the device not directly from the user device to the controlled device, but from the user device through, for example, a network, which then controls the device. In this embodiment, the one way communication from the controlled device, allows for separation of control of the device from a presentation on a controller. Embodiments of the present invention may be used to minimize the direct relationship between the machine and the user controlling device and shift this control to a network. Thus a direct relationship may be shifted in favor of a network relationship. This shift may be beneficial.

For example, the menu selection on a PDA for a vending machine may vary based on the country in which the machine is located, as well as a user language preference. Another example is where new menus for new items in a vending machine may be created and applied centrally at, for example, the vending machine manufacturer's web interface.

So for example, assume that the user with a wireless telephone, but with no cash on hand walks up to a beverage machine that indicates that it is "phone enabled." The beverage machine would send a "beacon" with an ID to the phone. The phone would communication with a network that may go to a portal that then directs the communication based on the ID to a dedicated server for handling beverage machines. The server may then communicate with both the beverage machine (as determined by the ID) and the phone. For example, displaying choices, prices, and a selection menu. The user may select an item, which is communicated to the server. The server checks the user's account for sufficient funds, and if there are sufficient funds, then instructs the machine to dispense the selected beverage.

The "beacon" may communicate more than just the ID, for example, it may include product offerings. In this mode then, until the user decides that they want one of the items, there is no need for communication from the user device to a network. At the point that the user selects an item, then communication from the user device to the network may be initiated, account balances checked, and the machine instructed to dispense a product.

However, it is to be appreciated that the device that sends the beacon in other embodiments of the invention need not have any interaction with the actual controlled device (e.g. the beacon is attached to the vending machine with no connection with the vending machine intelligence).

The present invention may be used to control devices such as medical devices, and other devices, which may have limited accessibility and/or small faces not allowing an input device, or those devices that need a controlled access. For example, a pump delivering a drug dose to a patient may be accessed only by a nurse or doctor having a handheld device. This would reduce the likelihood that the patient or visitors, such as kids, might punch in numbers on a keypad used for controlling the device.

Similarly, in another embodiment of the present invention, a doctor may roam around a hospital and if a patient's bed or environment is equipped with an identification system, may be able to retrieve the patient's information and adjust dosage levels as desired.

Using the present invention changes to the interface to the user device and/or the device being controlled may be made at the network level, thus not having to update and/or reprogram each individual user device and/or controlled device.

For example, a candy vending machine may only allow a single item to be purchased at a time. Normally if the user wanted, for example, six of a single item, this would require the user to enter money and press the purchase button six times. However, in one embodiment of the present invention, the user may enter a quantity of 6 and the network may control the dispensing device to dispense the six required by issuing the machine six single dispense commands.

In several of the above embodiment examples, from the user's perspective, they believe that they are directly controlling the machine. They need not be aware that the user device is receiving an ID from the machine and that the user device is coupled to a network and that the machine is being controlled from a network. Thus while the user believes they are directly controlling the machine, in reality, the control of the machine and the user view of controlling the machine have been separated.

In another embodiment of the present invention, a mechanic at an automotive repair shop may have a unit that reads the car ID and pulls up the history of the car and/or performs diagnostics. Additional features such as checking for recalls or spotting problem trends are also possible by consulting over the network to, for example, the car manufacturer's database.

In another embodiment of the present invention it offers a higher degree of security for sensitive information. For example, if you slide a credit card through, for example, a gas pump then that credit card information is transmitted and validated. Such a communication is capable of being intercepted. In an embodiment of the present invention, for example, a pump ID, the request to fill up, and a user ID would be transmitted, a server would look up and verify credit information, and the pump would be activated. No credit card information would need to be transmitted from a gas pump. This would also conserve communications bandwidth as a single unidirectional signal could control the pump rather than a bi-directional signal needed for sending the credit card information and then receiving the signal to pump the gas. Additionally, for stations connected via satellite, the cost of transmitting may require a satellite uplink that is expensive compared to a receiver-only downlink.

Embodiments illustrating broadcast of an ID have been used for explanation of the present invention. One of ordinary skill in the art will appreciate that an ID is a subset of information in general. Thus, for example, in one embodiment of the present invention, a restaurant may broadcast to a user driving up to a pickup window a dollar amount to be paid, and the user may opt to pay it by remotely accepting the amount and having it charged to their account. Another embodiment of the present invention would allow a customer in a restaurant to pay for a meal and not have the possibility that, when handing over an actual credit card to pay, an employee may make an extra copy of a charge or steal their credit card information.

The terms user device, input device, human input device, management interface, viewing device, etc., as well as examples of PDA, and telephone have been used. What is to be understood is that from the perspective of the user controlling the device these are inputs to and/or outputs that relate to controlling the device. Thus, from a user's perspective, a PDA screen may be a device for "viewing" what the controlled device has and/or accepts as input. From the network's perspective the user device may be an input/output device, and from the perspective of the network, the controlled device may have inputs and/or outputs. One of ordinary skill in the art will understand that the terms may be related to the viewpoint perspective.

Wireless communication was illustrated which may be, for example, via a cellular telephone network, a wireless LAN network, etc. Additionally, the transmission media may be RF (radio frequency), infrared, laser, etc. Wireless is envisioned as allowing more freedom than wired, however, the present invention does not preclude the use of a wired connection. For example, in the above example of the automotive repair shop, the mechanic's user device may be wired or wireless.

The present invention was illustrated in various embodiments in which a one way communication was made from the controlled device to the controlling device. Mentioned were techniques such as using a "beacon" from the device for identification, a bar code, a RFID (Radio Frequency ID), infrared signal, or a number on the controlled device. What is to be noted is that the controlled device is the originator of such an "identification" but need not be the mechanism for input into the controlling device. For example, an IR beacon may beam this information to a PDA, however in another embodiment a number on the controlled device may need to be entered manually by the user of on a PDA to control the device. That is a user action may be needed to make use of and/or acquire the controlled device identification. For example, in other embodiments, a bar code may be on the controlled device and thus require that the user of the controller "pass" the controller over the bar code to scan in the controlled device ID. In another embodiment, for example, to conserve energy a "beacon" may be continuously on and require a user action to activate the "beacon." An example would be where the user of a phone type controller may need to be in close proximity to the controlled machine which may then sense an RF field and then activate a beacon. An optical sensor is another approach where the user may need to be detected by the controlled machine before it will activate the "beacon." Thus, what is to be appreciated is that the one way communication of the "identification" information from the controlled device to the controlling device may be automatic, triggered, require user actions, or any combination of these, etc.

The use of the word "beacon" is not to be construed to limit the invention to a directional signal. Nor is it intended to limit the invention to a single "beacon" signal. Nor is it intended to limit the amount of information sent by a beacon. For example, in one embodiment of the invention an IR beacon may be used for a directional operation. In another embodiment of the invention radio frequency communications, such as Bluetooth, may be used for non-directional operation. Likewise embodiments of the invention may make use of multiple communications for beacons. For example, one embodiment of the invention may use both an IR beacon and a Bluetooth beacon. In this way, a larger range of user devices may be used for control. The information communicated by the beacon may range, depending upon the application, from for example, a few bits to megabytes. Thus, what is to be appreciated is that the beacon connection, no matter how much information is transferred, is one way.

It is also to be appreciated that the "beacon" can be quite independent of the device being controlled. It is not necessary for the beacon to be aware of the device to which it may be attached. Such an association between a beacon and a controlled device may reside somewhere else, for example, on a server connected to the Internet. The beacon also does not need to have any knowledge of the connection of the controlled device. For example, a beacon need not know that it is attached to or close to a vending machine, and need not know how the vending machine may be attached to and/or controlled by a network. Nor does the beacon need to know anything about the controlling device. That is the beacon need not know whether a user controlling device is phone, a PDA, etc.

In another embodiment of the present invention increased security is available via a user validation. For example, a device may send a security request through a network to a server. The server in turn may make a request to a user device for a validation of a session key. The user may input a validation based on a password, biometrics, etc. This validation then goes to the server and a session key is built for communication with the original device that sent the security request. Thus a session key is only available if the user consents to the communication request by providing a validation.

For example, in the medical device example above, the device when instructed to change a setting may send a security request to a server. The server in turn may request the user to enter a validation code, for example, the person's employee number; the server would receive this (perhaps after being encrypted itself at the user device) and then generate a session key that would allow the device to respond to user control.

If the medical device did not have the capability to send a security request, or ask for an acknowledgment of a control command, the present invention allows for such a request from an intelligent server. That is, the server could prompt the user for a validation on control commands that were deemed to require tracking. For example, a hospital could determine that a 10% change in a particular drug delivery was within normal parameters but that greater than a 10% change should be tracked and therefore the server would ask for validation of the control command.

In another embodiment of the present invention delivery of content to another destination is possible. For example, a movie on demand. At an airport, viewing could cease when a PDA is out of local range. In this way a content provider would be able to maximize profits by assuring that once a viewer has left the area that others wanting to view it must activate and pay.

Thus, what has been described are some of the various possible embodiments of the present invention.

Figure 1:
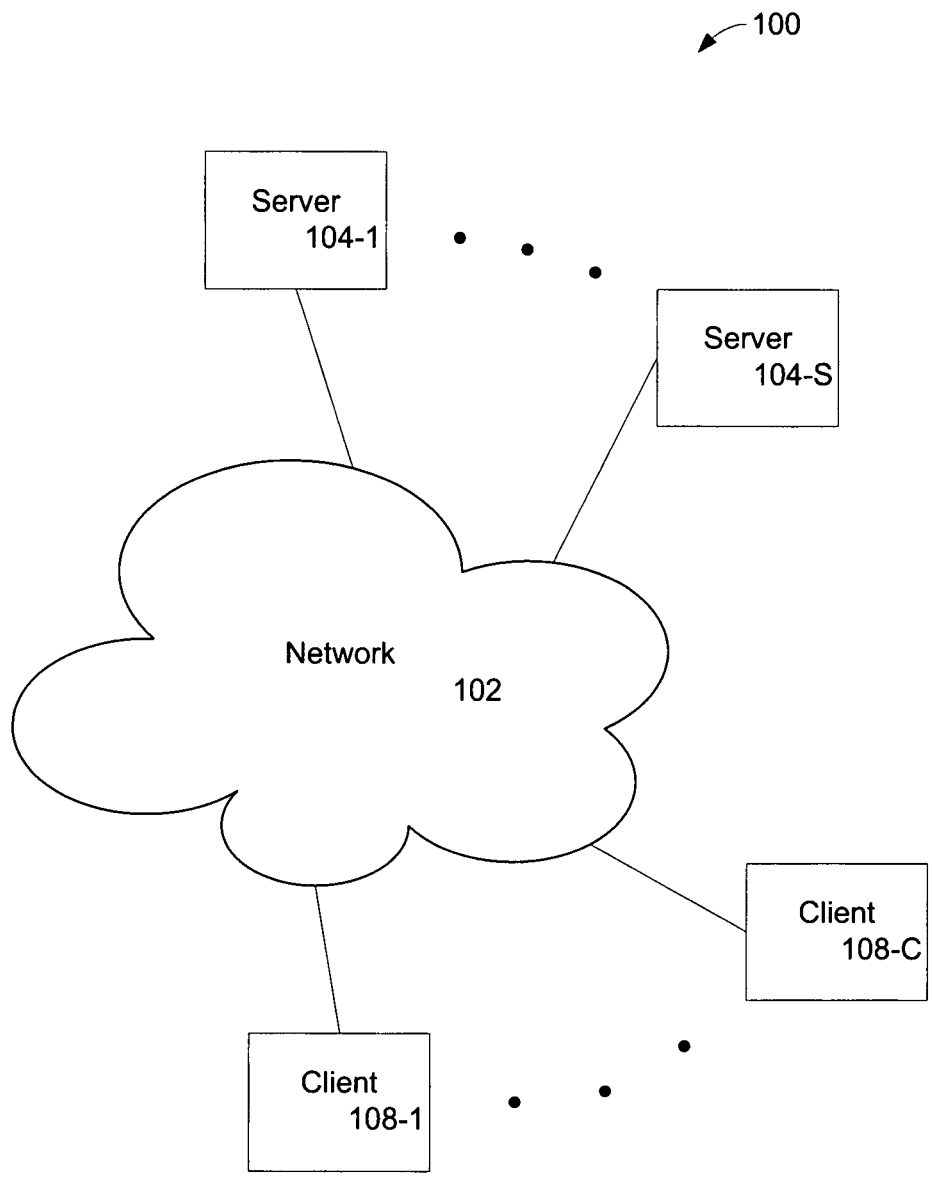
FIG. 1 illustrates a network environment in which the method and apparatus of the present invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
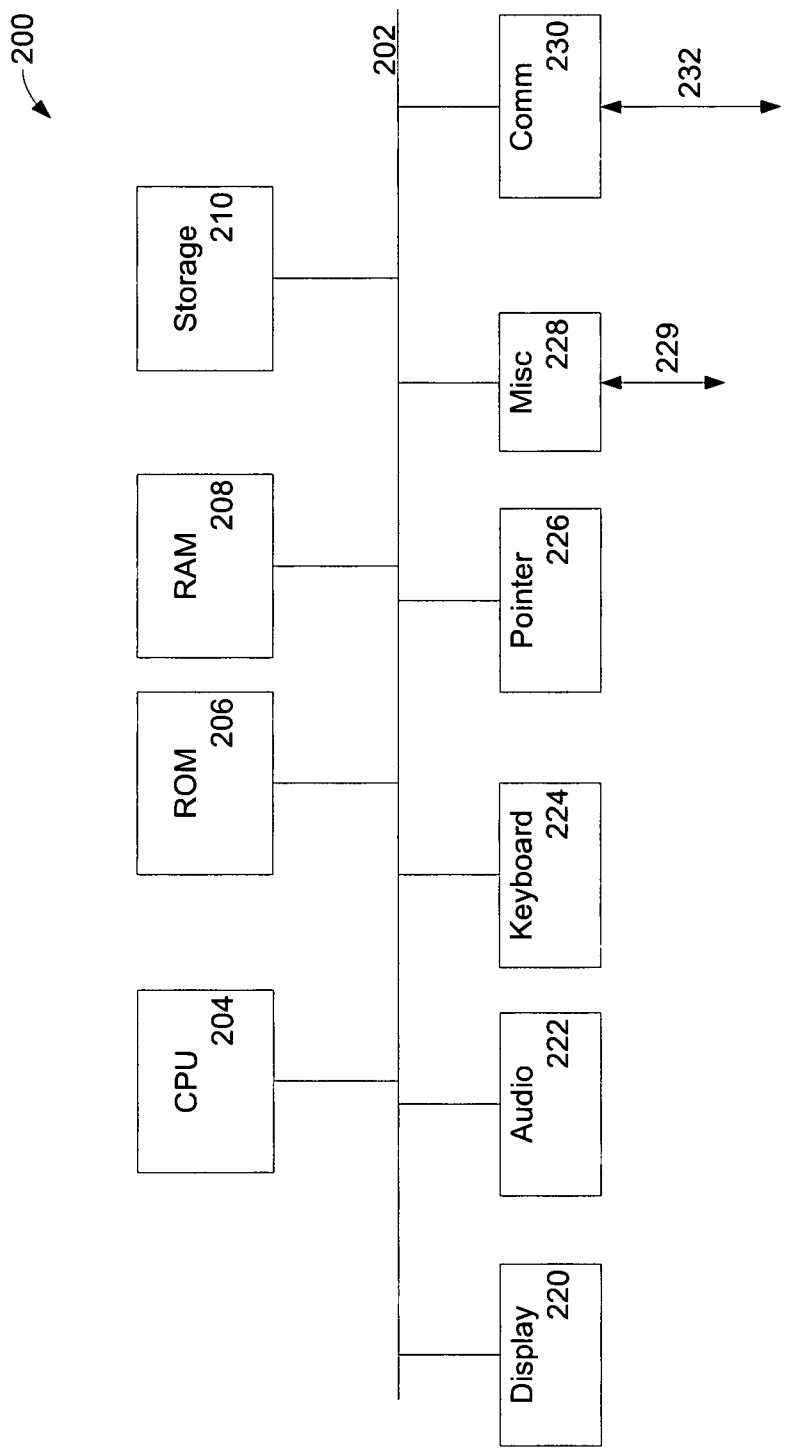
FIG. 2 is a block diagram of a computer system for implementing embodiments of the present invention.

FIG. 2 illustrates a computer system 200 in block diagram form, which may be representative of any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An "event" is understood by one skilled in the art and may be defined as transmitting information to/from one component to another, or for one component to call a method on another component. Upon reception an event may generates a state change in the receiving component, which by itself may change operation, program flow, etc. (for example, the UI presented to a user by the processing of a program or set of instructions).

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for third party control of a device have been described.

What is claimed is:

1. A method comprising:
   receiving on a user operable device wireless information comprising a device ID of a device to be controlled;
   displaying, by said user operable device, a menu using said device ID and receiving input information via said menu;
   sending, by said user operable device, based solely on said device ID and said received input information, a communication to a networked device; and
   controlling, by said networked device, said device to be controlled based on said communication.

2. The method of claim 1 wherein receiving input information into said user operable device consists of receiving input voice input information from a user.

3. The method of claim 1 wherein receiving input information into said user operable device consists of receiving input manual input information from a user.

4. The method of claim 1 wherein receiving input information into said user operable device consists of receiving input magnetic input information from a user.

5. The method of claim 1 wherein receiving input information into said user operable device consists of receiving input electrical input information from a user.

6. The method of claim 1 wherein receiving input information into said user operable device consists of receiving input optical input information from a user.

7. The method of claim 1 wherein receiving input information into said user operable device consists of receiving input biometric input information from a user.

8. A product comprising a first memory storing a first set of instructions and a second memory storing a second set of instructions, which when the first and second set of instructions are executed on a first processor and a second processor, respectively, cause the first and second processors to perform a method comprising:
   receiving, by said first processor, wireless information comprising a device ID of a device to be controlled;
   displaying, by said first processor, on said user operable device, a menu using said device ID and receiving input information via said menu;
   sending, by said first processor, based solely on said device ID and said received input information, a communication to the second processor; and
   controlling, by said second processor, said device to be controlled, based on said communication.

9. A system comprising:
   a first processor and a first memory storing executable instructions that when executed by the first processor causes the first processor to perform the steps of:

receiving wireless information comprising a device ID of a device to be controlled;

displaying by a user operable device, a menu using said device ID and receiving input information via said menu;

sending based solely on said device ID and said received input information, a communication to a second processor;

the second processor and a second memory storing executable instructions that when executed by the second processor causes the second processor to perform the steps of:

controlling, said device to be controlled, based on said communication.

10. The method of claim 1 wherein said user operable device has a first input, a second input, and an output, said first input coupled to receive a request to validate a session key building operation, said second input coupled to receive a user input, and said output coupled to transmit a signal based on said user input.

11. The method of claim 10 wherein said signal is based upon an input selected from the group consisting of said request to validate said session key building operation, said user input, a combination of said request to validate said session key building operation and said user input, a user based identification, and a user entry.

* * * * *